US012742542B2

(12) United States Patent
Ernst et al.

(10) Patent No.: US 12,742,542 B2
(45) Date of Patent: Sep. 22, 2026

(54) AIRTIGHT LIGHT FIXTURE TRIM RETENTION

(71) Applicant: SIGNIFY HOLDING B.V., Eindhoven (NL)

(72) Inventors: Oliver Ernst, Peachtree City, GA (US); Voya Vidakovic, Marietta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 104 days.

(21) Appl. No.: 18/792,318

(22) Filed: Aug. 1, 2024

(65) Prior Publication Data

US 2025/0075895 A1 Mar. 6, 2025

Related U.S. Application Data

(60) Provisional application No. 63/536,089, filed on Sep. 1, 2023.

(30) Foreign Application Priority Data

Sep. 14, 2023 (EP) .................................... 23197345

(51) Int. Cl.

*F21V 31/00* (2006.01)
*F21S 8/02* (2006.01)
*F21V 21/04* (2006.01)
*F21V 21/30* (2006.01)

(52) U.S. Cl.

CPC ............ *F21V 31/005* (2013.01); *F21S 8/026* (2013.01); *F21V 21/047* (2013.01); *F21V 21/30* (2013.01)

(58) Field of Classification Search

CPC ...... F21V 31/005; F21V 21/047; F21V 21/30; F21S 8/026; F21S 8/02
See application file for complete search history.

(56) References Cited

U.S. PATENT DOCUMENTS

| | | | |
|---|---|---|---|
| 2007/0183154 | A1 | 8/2007 | Robson |
| 2011/0228544 | A1 | 9/2011 | Dubord |
| 2015/0131296 | A1 | 5/2015 | Charles |

FOREIGN PATENT DOCUMENTS

| | | | | |
|---|---|---|---|---|
| CN | 206608821 U | 2/2017 | | |
| CN | 213453207 U | 6/2021 | | |
| DE | 202017005484 U1 | 12/2017 | | |
| KR | 1248155 B1 * | 4/2013 | .............. | F21S 8/026 |

OTHER PUBLICATIONS

KR 1248155 B1 machine translation (Year: 2013).*

* cited by examiner

*Primary Examiner* — Anne M Hines
*Assistant Examiner* — Jose M Diaz

(57) ABSTRACT

A recessed light fixture includes a trim housing having a trim housing wall and a trim housing cavity bound by the trim housing wall. The recessed light fixture further includes a trim having a trim wall and a trim cavity bound by the trim wall, where the trim is at least partially positioned in the trim housing cavity. The recessed light fixture also includes a trim retention elastic band positioned around the trim wall and between the trim wall and the trim housing wall. The trim retention elastic band is compressed by the trim wall and the trim housing wall such that the trim is attached to the trim housing by friction between the trim retention elastic band and the trim wall and between trim retention elastic band and the trim housing wall.

15 Claims, 8 Drawing Sheets

AIRTIGHT LIGHT FIXTURE TRIM RETENTION

CROSS-REFERENCE TO PRIOR APPLICATIONS

This application claims priority to both European Patent Application No. 23197345.4, filed on Sep. 14, 2023, and U.S. Provisional Application No. 63/536,089, filed on Sep. 1, 2023. These applications are hereby incorporated by reference herein.

FIELD OF THE INVENTION

The present disclosure relates generally to lighting solutions, and in particular to airtight attachment and retention of a light fixture trim to a trim housing.

BACKGROUND OF THE INVENTION

A recessed luminaire may include a trim that is at least partially positioned inside a trim housing. In general, attaching a trim to a trim housing can be challenging. For example, spring-based trim attachment structures are often used to attach a trim to a trim housing of a luminaire. During a typical process of attaching a trim to a trim housing, the trim itself may block the spring-based trim attachment structures from view by an installer and thereby making the attachment of the trim to the trim housing challenging. The trim can also restrict tool and hand access to the spring-based trim attachment structures. The orientation of the trim relative to the trim housing may also be restricted by the locations of the trim attachment structures. Further, because typical trim attachment structures do not provide airtight attachment and retention of a trim to a housing, a separate structure may be required to block the passage of air between the trim and the trim housing. Thus, a solution that facilitates airtight attachment and retention of a trim to a trim housing is desirable.

SUMMARY OF THE INVENTION

The present disclosure relates generally to lighting solutions, and in particular to airtight attachment and retention of a light fixture trim to a trim housing. In an example embodiment, recessed light fixture includes a trim housing having a trim housing wall and a trim housing cavity bound by the trim housing wall. The recessed light fixture further includes a trim having a trim wall and a trim cavity bound by the trim wall, where the trim is at least partially positioned in the trim housing cavity. The recessed light fixture also includes a trim retention elastic band positioned around the trim wall and between the trim wall and the trim housing wall. The trim retention elastic band is compressed by the trim wall and the trim housing wall such that the trim is attached to the trim housing by friction between the trim retention elastic band and the trim wall and between trim retention elastic band and the trim housing wall.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

Figure 1:
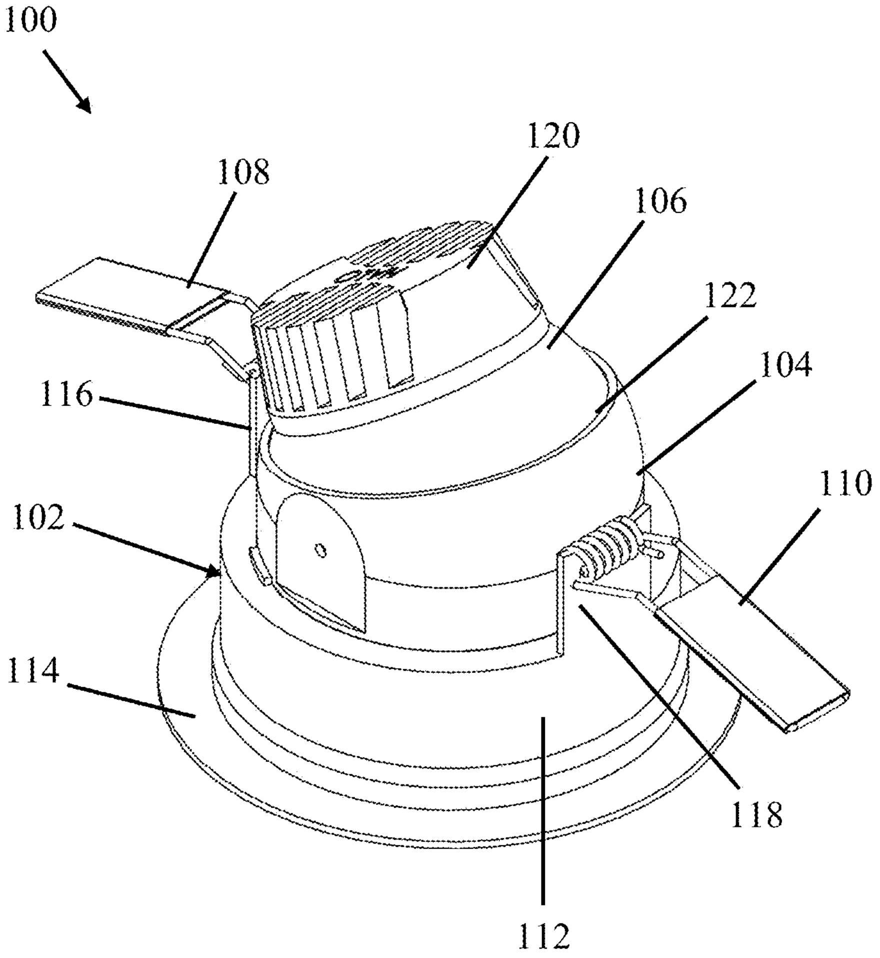
FIG. 1 illustrates a perspective view of a direct mount recessed light fixture according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the figures, the same reference numerals used in different figures may designate like or corresponding and not necessarily identical elements.

DETAILED DESCRIPTION OF THE EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Figure 2:
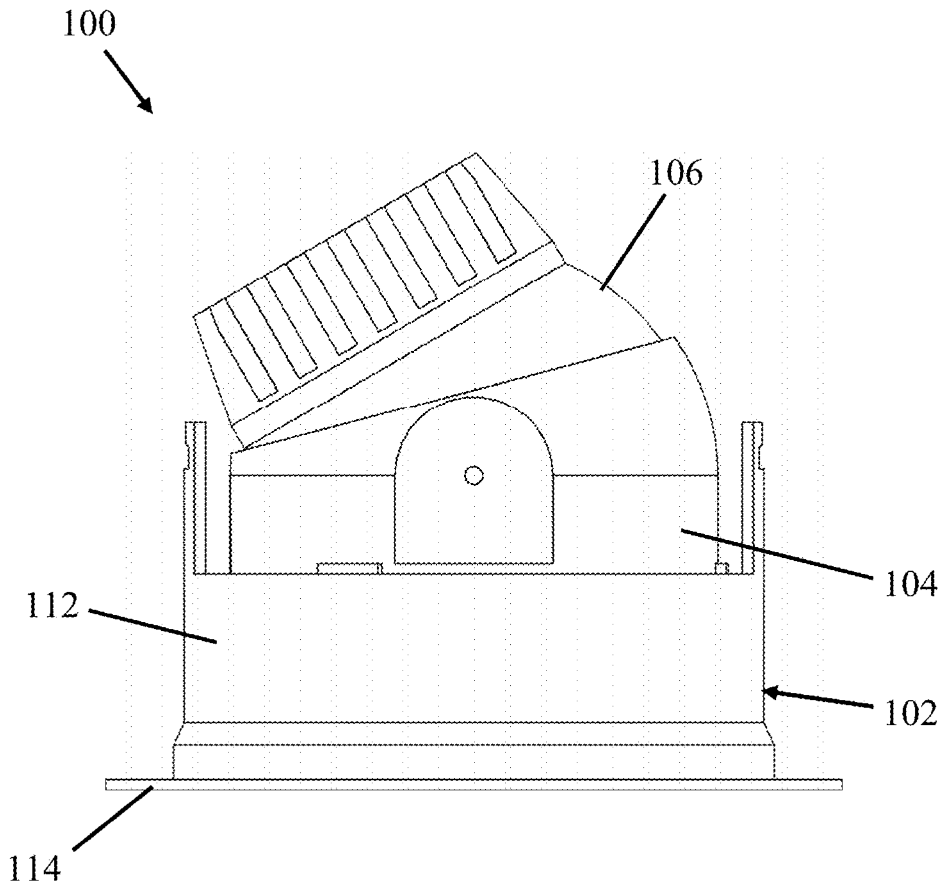
FIG. 2 illustrates a side view of the direct mount recessed light fixture of FIG. 1 according to an example embodiment.
Figure 3:
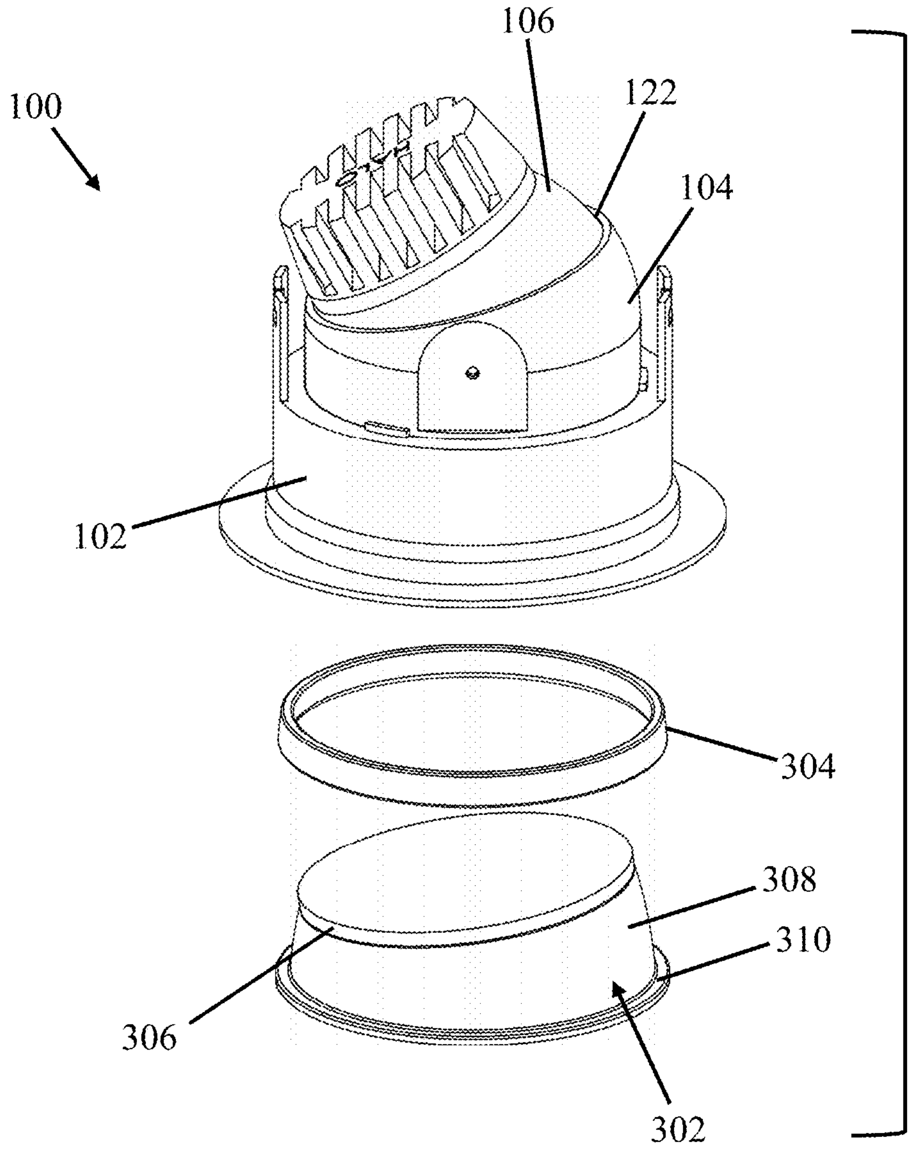
FIG. 3 illustrates an exploded view of the direct mount recessed light fixture of FIG. 2 according to an example embodiment.

Turning now to the drawings, example embodiments are described. FIG. 1 illustrates a perspective view of a direct mount recessed light fixture 100 according to an example embodiment, FIG. 2 illustrates a side view of the direct mount recessed light fixture 100 of FIG. 1 according to an example embodiment, and FIG. 3 illustrates an exploded view of the direct mount recessed light fixture 100 of FIG. 2 according to an example embodiment. In some example embodiments, the direct mount recessed light fixture 100 may be installed in a ceiling structure without a light fixture housing. The direct mount recessed light fixture 100 includes a trim housing 102, a gimbal structure 104, and a rotatable enclosure section 106. The gimbal structure 104 may be attached to the trim housing 102, for example, using one or more clips and/or other fasteners. The rotatable enclosure section 106 is rotatably attached to the gimbal structure 104 where air may enter and exit the direct mount recessed light fixture 100 through a space 122 between the gimbal structure 104 and the rotatable enclosure section 106. The rotatable enclosure section 106 may include a heat sink 120 that can dissipate heat generated by components of the direct mount recessed light fixture 100. The direct mount recessed light fixture 100 may include spring brackets 108, 110 that are used to retain the direct mount recessed light fixture 100 recessed in a ceiling as can be readily understood by those of ordinary skill in the art with the benefit of this disclosure. The spring brackets 108, 110 are not shown in FIGS. 2 and 3 for clarity of illustration.

In some example embodiments, the trim housing 102 may include a trim housing wall 112 and a trim housing flange 114. The trim housing flange 114 may extend out outwardly from the trim housing wall 112. The trim housing 102 may also include bracket mounts 116, 118 that extend up from the trim housing wall 112, for example, at an opposite end of the trim housing wall 112 from the trim housing flange 114. For example, the spring bracket 108 may be attached to the bracket mount 116, and the spring bracket 110 may be attached to the bracket mount 118.

In some example embodiments, the direct mount recessed light fixture 100 includes a trim 302 and a trim retention elastic band 304. The trim 302 may be at least partially positioned inside the trim housing 102 and may be retained attached to the trim housing 102 by the trim retention elastic band 304. The trim retention elastic band 304 may be positioned around the trim wall 308 such that the trim 302 is retained attached to the trim housing 102 by friction between the trim retention elastic band 304 and the trim 302 and between the trim retention elastic band 304 and the trim housing wall 112. The trim retention clastic band 304 may be positioned between the trim 302 and the trim housing 102 such that the retention elastic band 304 prevents the passage of air between the trim 302 and the trim housing 102.

In some example embodiments, the trim 302 may include a trim wall 308 and a trim flange 310. The trim flange 310 may extend outwardly from the trim wall 308 at a bottom end portion of the trim 302. The direct mount recessed light fixture 100 may also include a lens 306 that is attached to the trim 302 at a top end portion of the trim 302. For example, the lens 306 may be positioned on the trim 302 and may close off a top opening of the trim 302. The lens 306 may be attached to the trim 302 using an adhesive and/or another material. In general, the lens 306 may be attached to the trim 302 such that the lens 306 closes off the top opening of the trim 302 to prevent the passage of air through the trim 302.

By using the trim retention elastic band 304, the trim 302 can be conveniently attached to the trim housing 102 without using a tool. The trim retention elastic band 304 also eliminates the need for multiple trim attachment structures to attach the trim 302 to the trim housing 102. The trim retention elastic band 304 also eliminates the need for a separate structure to provide airtight attachment of the trim 302 to the trim housing 102. By providing an airtight attachment of the trim 302 to the trim housing 102, air flow between a space below a ceiling (e.g., an air conditioned space) and a space behind the ceiling through the trim housing 102 may be eliminated or significantly reduced. The airtight attachment of the lens 306 to the trim 302 prevents air flow through the trim 302.

In some alternative embodiments, the trim housing 102, the trim 302, the trim retention elastic band 304, and/or the lens 306 may each have a different shape than shown without departing from the scope of this disclosure. For example, the trim housing 102, the trim 302, and the lens 306 may each have a rectangular horizontal cross-sectional shape. In some alternative embodiments, the trim housing 102 and the gimbal structure 104 may be formed as a single housing without departing from the scope of this disclosure. In some example embodiments, the direct mount recessed light fixture 100 may instead be a recessed light fixture that includes a light fixture housing without departing from the scope of this disclosure. For example, the trim housing 102, the gimbal structure 104, and the rotatable enclosure section 106 may be formed as a single light fixture housing that includes one or more openings, for example, in the rotatable enclosure section 106. Alternatively, the trim housing 102, the gimbal structure 104, and the rotatable enclosure section 106 may be replaced by a can light fixture housing that has one or more openings at the back side of the housing without departing from the scope of this disclosure. In some alternative embodiments, the heat sink 120 may be omitted or may have a different shape than shown without departing from the scope of this disclosure.

Figure 4A:
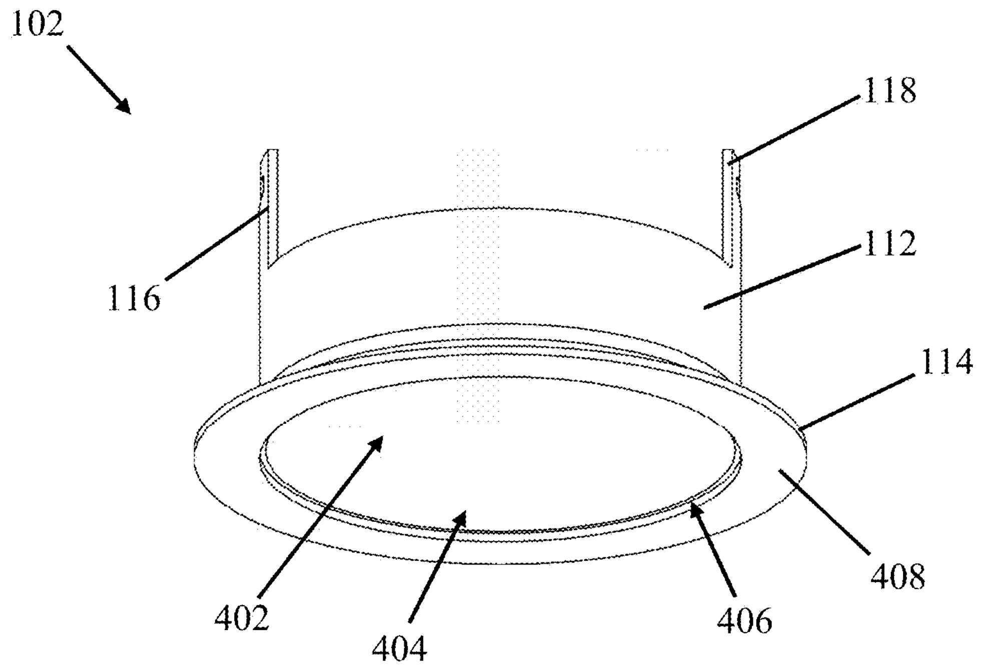
FIG. 4A illustrates a perspective view of the trim housing of the direct mount recessed light fixture of FIGS. 1-3 according to an example embodiment.
Figure 4B:
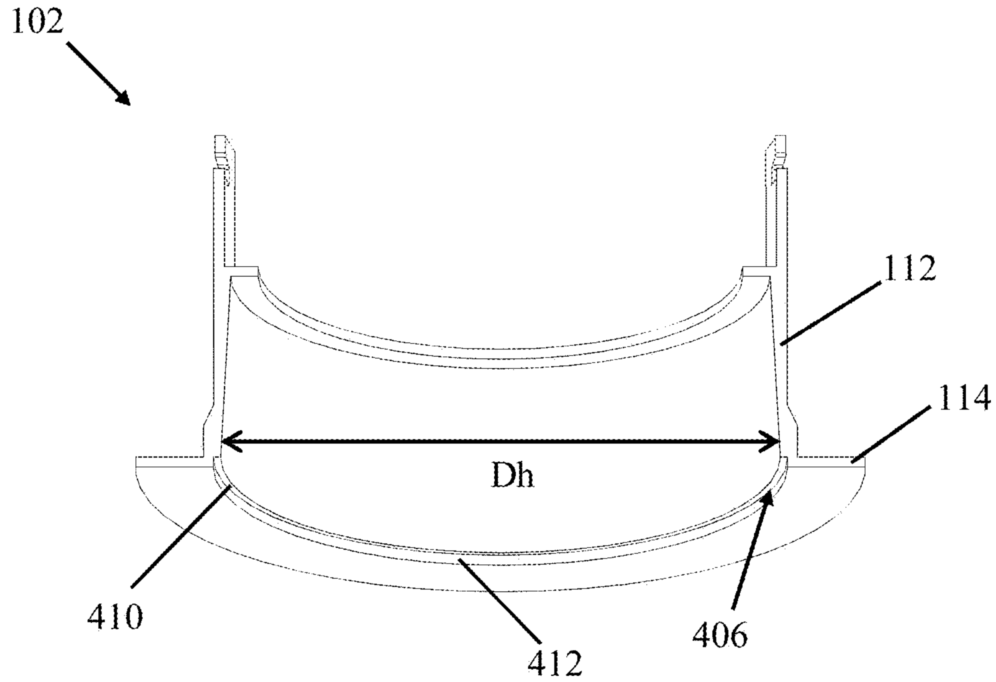
FIG. 4B illustrates a cross-section view of the trim housing of FIG. 4A according to an example embodiment.

FIG. 4A illustrates a perspective view of the trim housing 102 of the direct mount recessed light fixture 100 of FIGS. 1-3 according to an example embodiment, and FIG. 4B illustrates a cross-section view of the trim housing 102 of FIG. 4A according to an example embodiment. In some example embodiments, the trim housing 102 includes the trim housing wall 112 and the trim housing flange 114. The trim housing 102 has a trim housing cavity 402 that is bound by the trim housing wall 112. For example, the trim housing wall 112 may have an inner diameter Dh. The trim housing wall 112 may have the inner diameter Dh for the entire height of the trim housing wall 112. Alternatively, the trim housing wall 112 may have the inner diameter Dh proximal to the bottom opening 404 and may be tapered as the trim housing wall 112 extends upward away from the trim housing flange 114. The trim housing flange 114 extends outwardly from the trim housing wall 112 at a bottom opening 404 of the trim housing 102. After the direct mount recessed light fixture 100 of FIGS. 1-3 is installed recessed in a ceiling, a front surface 408 of the trim housing flange 114 faces a space that is illuminated by light provided by the direct mount recessed light fixture 100, and the back surface of the trim housing flange 114 may abut against the ceiling from below the ceiling.

In some example embodiments, the trim housing 102 may include a channel 406. A top wall 410 of the channel 406 may be a bottom perimeter of the trim housing wall 112, and a side wall 412 of the channel 406 may be an inner perimeter of the trim housing flange 114. An outer portion of the trim flange 310 of the trim 302 shown in FIG. 3 may be positioned in the channel 406 where the top wall 410 of the channel 406 prevents the movement of the trim 302 into the trim housing cavity 402 after the trim flange 310 comes in contact with the top wall 410. For example, the trim flange 310 may be flush with the trim housing flange 114 when the trim flange 310 is in contact with the top wall 410. The trim flange 310 coming in contact with the top wall 410 of the channel 406 may also serve as an indication to an installer that the trim 302 is fully attached to the trim housing 102.

In some example embodiments, the trim housing 102 may be made from plastic or another suitable material using one or methods such as molding, cutting, and/or other methods as can be readily understood by those of ordinary skill in the art with the benefit of this disclosure.

In some example embodiments, the bracket mounts 116, 118 extend up from the trim housing wall 112 and across from each other. The bracket mounts 116, 118 are used to attach the spring brackets 108, 110, respectively. In some alternative embodiments, the trim housing 102 may include other structures instead of or in addition to the bracket mounts 116, 118 for attaching the light fixture retention structures that can be used to retain the direct mount recessed light fixture 100 attached to a ceiling.

Figure 5A:
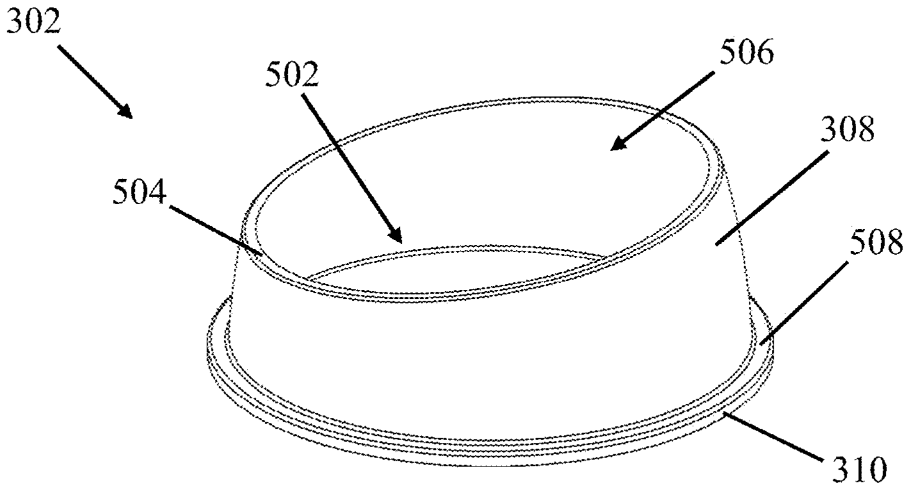
FIGS. 5A and 5B illustrate different perspective views of the trim of the direct mount recessed light fixture of FIGS. 1-3 according to an example embodiment.
Figure 5B:
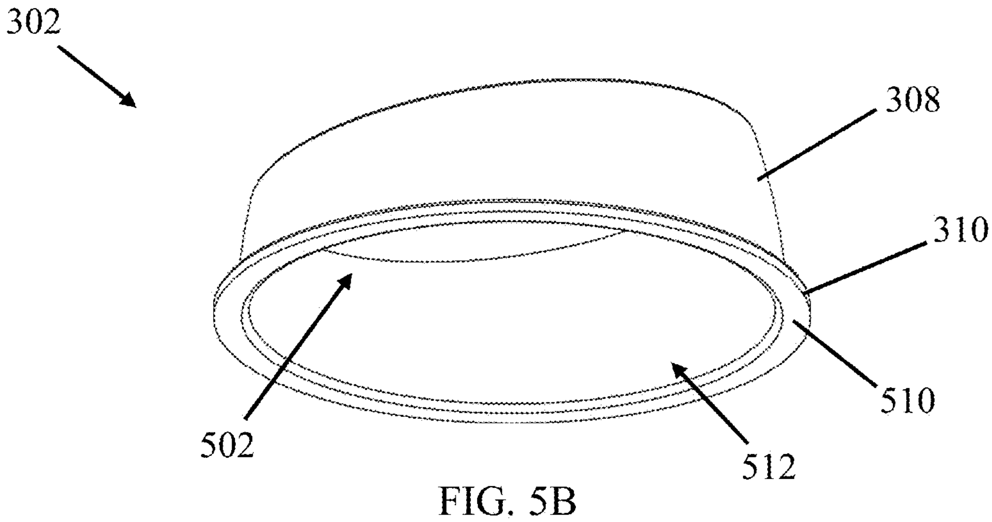
Figure 5C:
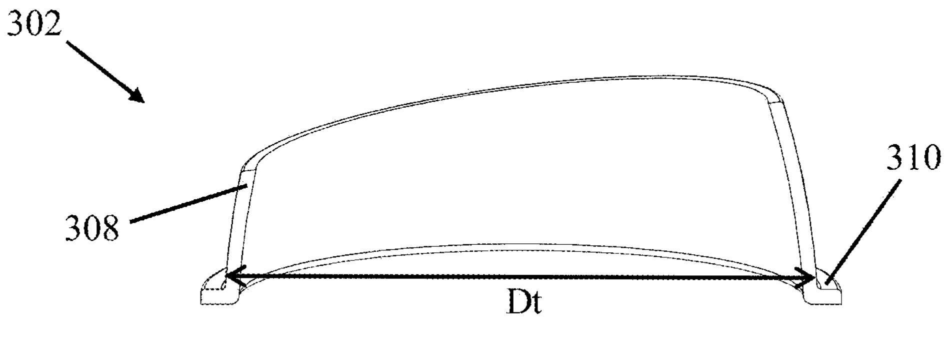
FIG. 5C illustrates a cross-section view of the trim of FIGS. 5A and 5B according to an example embodiment.

FIGS. 5A and 5B illustrate different perspective views of the trim 302 of the direct mount recessed light fixture 100 of FIGS. 1-3 according to an example embodiment, and FIG. 5C illustrates a cross-section view of the trim 302 of FIGS. 5A and 5B according to an example embodiment. In some example embodiments, the trim 302 includes the trim wall 308 and the trim flange 310. A trim cavity 502 of the trim 302 is bound by the trim wall 308. The trim flange 310 extends outwardly from the trim wall 308 at a bottom opening 512 of the trim 302. The trim wall 308 includes a perimeter edge 504 that extends around a top opening 506 of the trim 302. For example, the perimeter edge 504 may be sloped as the perimeter edge 504 extends from the tallest location of the trim wall 308 to the shortest location of the trim wall 308. The perimeter edge 504 may provide a surface for the lens 306 shown in FIG. 3 to be positioned thereon and thereby closing off the top opening 506 of the trim 302. An adhesive may also be used to securely attach the lens 306 to the perimeter edge 504.

In some example embodiments, the trim flange 310 may include a back surface 508 and a front surface 510. After the trim 302 is inserted in the trim housing cavity 402 of the trim housing 102, the back surface 508 of the trim flange 310 may be in contact with the top wall 410 of the channel 406 of the trim housing 102 shown in FIGS. 4A and 4B. After the direct mount recessed light fixture 100 of FIGS. 1-3 is installed recessed in a ceiling, the front surface 510 of the trim flange 310 may face the area below the direct mount recessed light fixture 100.

In some example embodiments, the trim wall 308 may have an outer diameter Dt proximal to the bottom opening 512 and the trim flange 310. For example, the trim wall 308 may have the outer diameter Dt right above the trim flange 310. The trim wall 308 may be tapered as the trim wall 308 extends upward away from the trim flange 310.

In some example embodiments, the trim 302 may be a reflector. Alternatively, the trim 302 may be a baffle. For example, the trim 302 may be made using a material such as plastic. The trim 302 may be made using methods such as molding, cutting, etc. as can be readily understood by those of ordinary skill in the art with the benefit of this disclosure. The trim wall 308 may be structurally strong enough to remain dimensionally unchanged by the trim retention elastic band 304 of FIG. 3 when the trim retention elastic band 304 is placed around the trim wall 308.

In some alternative embodiments, the trim 302 may have a different shape than shown without departing from the scope of this disclosure. In some alternative embodiments, the perimeter edge 504 may be leveled instead of sloped without departing from the scope of this disclosure.

Figure 6A:
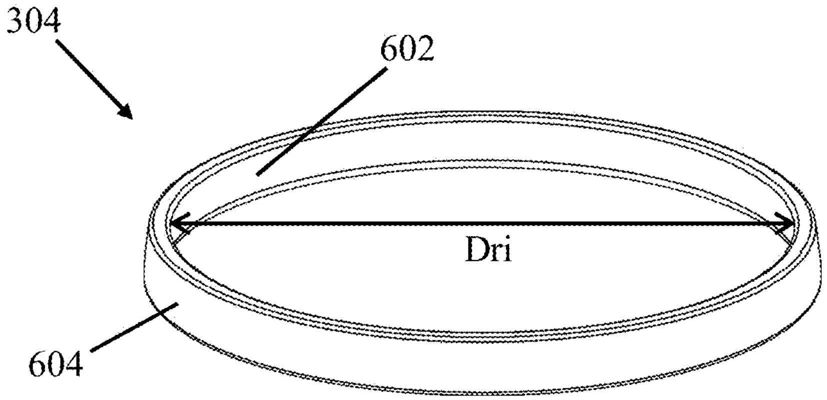
FIG. 6A illustrates the trim retention elastic band of the direct mount recessed light fixture of FIGS. 1-3 according to an example embodiment.
Figure 6B:
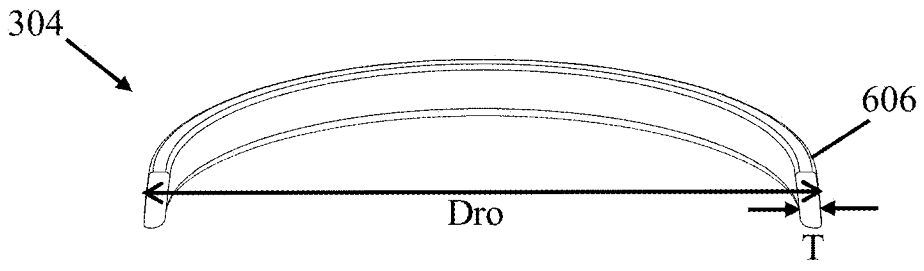
FIG. 6B illustrates a cross-section view of the trim retention elastic band of FIG. 6A according to an example embodiment.
Figure 7:
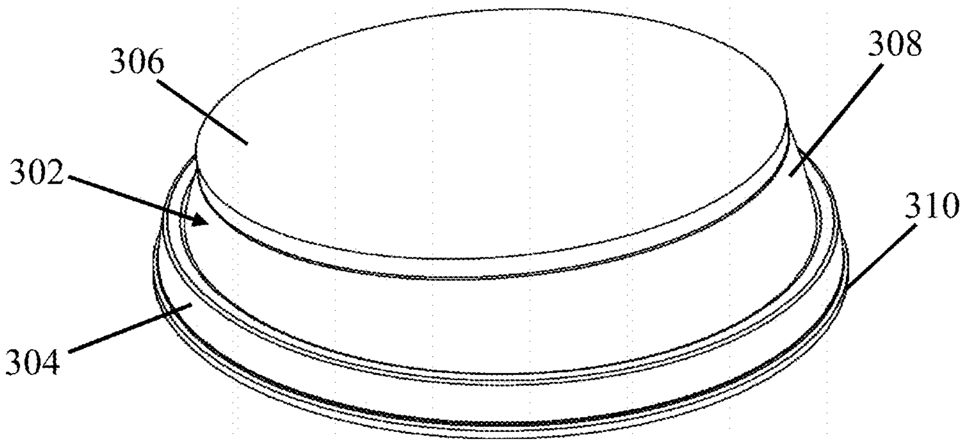
FIG. 7 illustrates the trim retention elastic band of FIG. 6A attached to the trim of FIG. 5A according to an example embodiment.

FIG. 6A illustrates the trim retention elastic band 304 of the direct mount recessed light fixture 100 of FIGS. 1-3 according to an example embodiment, FIG. 6B illustrates a cross-section view of the trim retention elastic band 304 of FIG. 6A according to an example embodiment, and FIG. 7 illustrates the trim retention elastic band 304 of FIG. 6A attached to the trim 302 of FIG. 5A according to an example embodiment. Referring to FIGS. 1-6B, in some example embodiments, the trim retention elastic band 304 may be elastic where the trim retention elastic band 304 can be stretched to have a larger size. The trim retention elastic band 304 may also be compressible. In general, the trim retention elastic band 304 may be made from one or more elastomeric materials. For example, the trim retention elastic band 304 may be made from rubber. The trim retention elastic band 304 may be made using methods such as molding, heating, cutting, etc. as can be readily understood by those of ordinary skill in the art with the benefit of this disclosure. In general, the trim retention elastic band 304 may be elastic and flexible.

In some example embodiments, the trim retention elastic band 304 may have an inner surface 602, an outer surface 604, and a thickness T between the inner surface 602 and the outer surface 604. When the trim retention elastic band 304 is placed around the trim wall 308, the inner surface 602 of the trim 302 may be in contact with the trim wall 308 on the outside of the trim 302. The outer surface 604 may be in contact with the inner surface of the trim housing wall 112 when the trim 302 is inserted into the trim housing cavity 402 of the trim housing 102 after the trim retention elastic band 304 is placed around the trim wall 308. The trim retention elastic band 304 may include an outer chamfered edge 606 that can case the insertion of the trim 302 and the trim retention elastic band 304 into the trim housing cavity 402.

In some example embodiments, when the trim retention elastic band 304 is unstretched, the trim retention elastic band 304 may have an unstretched inner diameter Dri between diametrically opposite locations on the inner surface 602 of the trim 302. The trim retention elastic band 304 may also have an unstretched outer diameter Dro. Because the unstretched inner diameter Dri is slightly smaller than the outer diameter Dt of the trim wall 308 of the trim 302 shown in FIG. 5C, the trim retention elastic band 304 becomes stretched when the trim retention elastic band 304 is placed around the trim wall 308 proximal to the trim flange 310. The trim retention elastic band 304 may be placed around the trim wall 308, for example, by moving the trim retention elastic band 304 down along the trim wall 308. Indeed, the trim retention elastic band 304 may be positioned around the trim wall 308 of the trim 302 and on the trim flange 310 of the trim 302. The trim retention elastic band 304 may be held attached to the trim wall 308 by friction between the trim retention elastic band 304 and the trim wall 308. The lens 306 may be attached to the trim 302 before or after the trim retention elastic band 304 is positioned around the trim wall 308.

Figure 8:
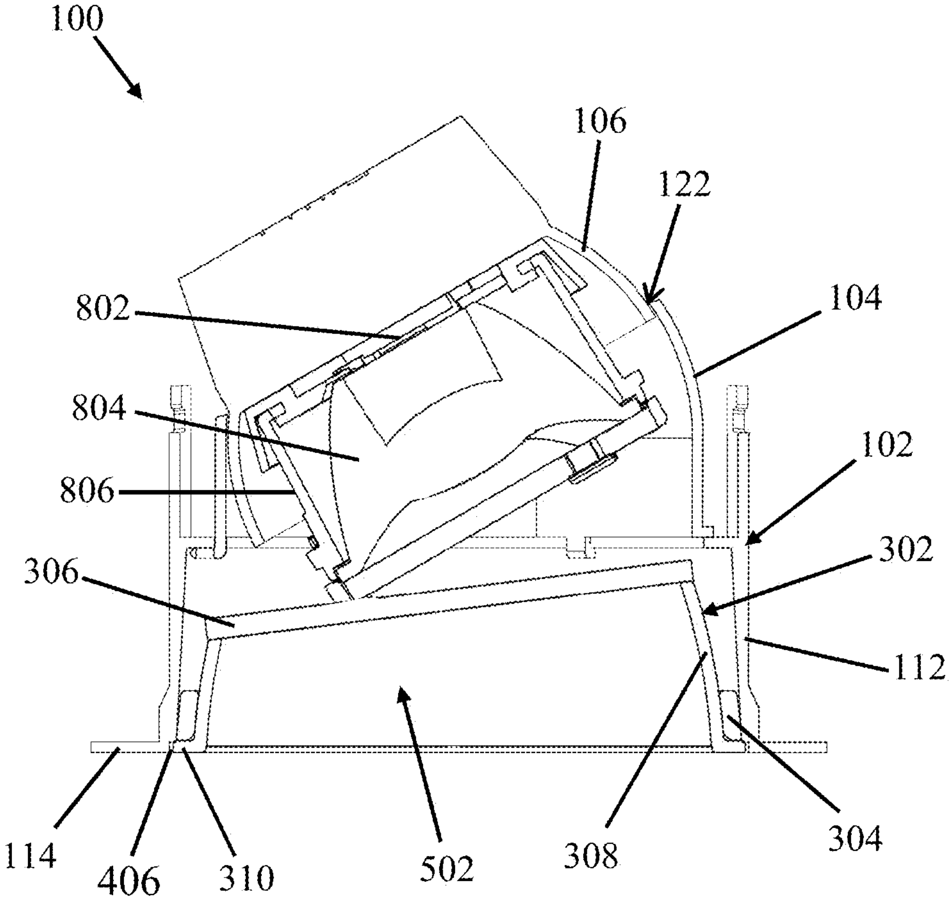
FIG. 8 illustrates a cross-section view of the direct mount recessed light fixture of FIG. 2 according to an example embodiment.

FIG. 8 illustrates a cross-section view of the direct mount recessed light fixture 100 of FIG. 2 according to an example embodiment. Referring to FIGS. 1-8, in some example embodiments, the direct mount recessed light fixture 100 includes the trim housing 102, the trim 302, the gimbal structure 104, and the rotatable enclosure section 106 rotatably attached to the gimbal structure 104. The direct mount recessed light fixture 100 may also include a light source 802 (e.g., a light emitting diode light source), an optic 804, and an optic retention bracket 806. The optic retention bracket 806 is used to retain the optic 804 attached to the rotatable enclosure section 106 such that the optic 804 is rotatable along with the rotatable enclosure section 106. The optic 804 is positioned to direct light emitted by the light source 802 that may be attached, for example, to the rotatable enclosure section 106 inside the direct mount recessed light fixture 100. The optic 804 may direct the light emitted by the light source 802 toward the lens 306 such that the light passes through the lens 306 and the trim cavity 502 to illuminate an area, for example, below the direct mount recessed light fixture 100.

As described above, the lens 306 may be positioned on the trim 302 closing off the top opening 506 of the trim 302. The lens 306 may be positioned on the perimeter edge 504 of the trim wall 308 of the trim 302 thereby closing off the top opening 506 of the trim 302 and preventing the passage of air through the cavity 502 of the trim 302.

In some example embodiments, after the trim retention elastic band 304 is placed around the trim wall 308 of the trim 302, the trim 302 along with the trim retention elastic band 304 may be inserted into the trim housing cavity 402 of the trim housing 102. For example, the trim 302 along with the trim retention elastic band 304 may be pushed into the trim housing cavity 402. To illustrate, the trim 302 along with the trim retention elastic band 304 may be pushed into the trim housing cavity 402 (the trim retention elastic band 304 bypassing the channel 406 during install and being installed above the top wall 410 of the channel 406, thus unbound by the channel 406) until the trim flange 310 is in contact with the top wall 410 of the channel 406 of the trim housing 102. FIG. 8 shows the notch cross section profile of channel 406.

Referring to FIGS. 1-8, as described above, the top wall 410 of the channel 406 may serve as a stop to prevent further movement of the trim 302 into the trim housing 102 once the trim flange 310 comes in contact with the top wall 410 of the channel 406. When the trim flange 310 is in contact with the top wall 410 of the channel 406 of the trim housing 102, the trim flange 310 may be flush with the trim housing flange 114. When the trim 302 and the trim retention elastic band 304 positioned around the trim wall 308 of the trim 302 are inside the trim housing cavity 402, the trim retention elastic band 304 may be positioned between the trim 302 and the trim housing 102 compressed by the trim housing wall 112 and by the trim wall 308. Because the outer diameter Dro of the trim retention elastic band 304 may be slightly larger than the inner diameter Dh of the trim housing wall 112 of the trim housing 102, inserting the trim 302 and the trim retention elastic band 304 into the trim housing cavity 402 may require adequate force. After the trim 302 and the trim retention elastic band 304 are positioned in the trim housing cavity 402 of the trim housing 102, the trim 302 is retained attached to the trim housing 102 by friction between the trim retention elastic band 304 and the trim 302 and between the trim retention elastic band 304 and the trim housing 102. The trim 302 can be easily detached from the trim housing 102, for example, by pulling the trim 302 away from the trim housing 102 with adequate force and without having to use a tool.

In some example embodiments, the trim retention elastic band 304 may provide an airtight attachment of the trim 302 to the trim housing 102 such that the trim retention elastic band 304 prevents the passage of air between the trim 302 and the trim housing 102. For example, by preventing air flow through a gap between the trim 302 and the trim housing 102, the trim retention elastic band 304 may prevent air flow between an air conditioned space below the direct mount recessed light fixture 100 and an area behind a ceiling that is not air conditioned. To illustrate, without the airtight attachment of the trim 302 to the trim housing 102 by the trim retention elastic band 304, air can flow through the space 122 between the gimbal structure 104 and the rotatable enclosure section 106 and pass between the trim 302 and the trim housing 102. To be clear, the lens 306 prevents air flow through the trim cavity 502, and the trim retention elastic band 304 prevents air flow between the trim 302 and the trim housing 102.

By using the trim retention elastic band 304, the trim 302 can be conveniently attached to the trim housing 102 without using a tool. The trim retention elastic band 304 enables the trim 302 to be attached to the trim housing 102 in a desired horizontal rotational position relative to the trim housing 102. The trim retention elastic band 304 also enables a toolless detachment of the trim 302 from the trim housing 102 without requiring the removal of the trim housing 102 or the direct mount recessed light fixture 100. The trim retention elastic band 304 may also enable the installation of the direct mount recessed light fixture 100 at wet locations. The trim retention elastic band 304 also eliminates the need for a separate structure to provide airtight attachment of the trim 302 to the trim housing 102.

In some alternative embodiments, the trim flange 310 of the trim 302 may extend below and overlap with the trim housing flange 114 of the trim housing 102. For example, the trim flange 310 may extend out to fully cover the trim housing flange 114 from view from below the direct mount recessed light fixture 100 after the direct mount recessed light fixture 100 is installed in a ceiling. In some alternative embodiments, the optic 804 may have a different shape than shown without departing from the scope of this disclosure. In some alternative embodiments, the optic 804 may be omitted without departing from the scope of this disclosure.

Figure 9A:
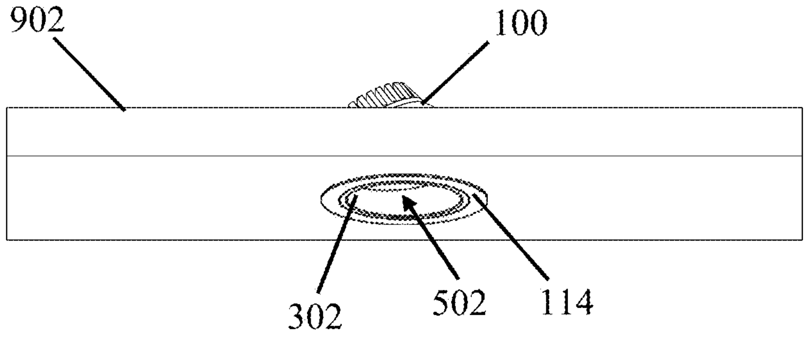
FIGS. 9A and 9B illustrate different views of the direct mount recessed light fixture of FIGS. 1-3 installed in a ceiling structure according to an example embodiment.
Figure 9B:
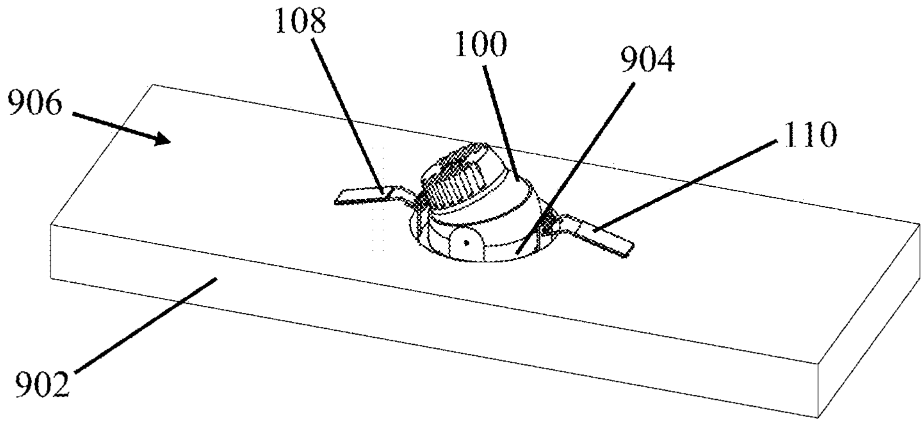

FIGS. 9A and 9B illustrate different views of the direct mount recessed light fixture 100 of FIGS. 1-3 installed in a ceiling structure 902 according to an example embodiment. Referring to FIGS. 1-9B, in some example embodiments, the direct mount recessed light fixture 100 may be recessed in the ceiling structure 902 through an opening 904 in the ceiling structure 902. The spring brackets 108, 110 may retain the direct mount recessed light fixture 100 attached to ceiling structure 902 on a back side 906 of the ceiling structure 902. The trim 302 may be attached to the trim housing 102 by the trim retention elastic band 304 inside the trim housing cavity 402. The trim housing flange 114 may abut against the ceiling structure 902 from below, and the trim flange 310 may be flush with trim housing flange 114. The direct mount recessed light fixture 100 may provide light through the trim housing cavity to illuminate an area below the ceiling structure 902, and the trim retention elastic band 304 may provide an airtight attachment between the trim 302 and the trim housing 102 that prevents airflow between the area below the ceiling structure 902 and the area at the back side 906 of the ceiling structure 902.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

What is claimed is:

1. A recessed light fixture, comprising:

a trim housing having a trim housing wall and a trim housing cavity bound by the trim housing wall, wherein the trim housing includes a channel formed at least in part by the trim housing, wherein the channel has a top wall;

a trim having a trim wall, wherein the trim includes a trim flange that extends outwardly from the trim wall, wherein the trim is at least partially positioned in the trim housing cavity;

a trim retention elastic band stretched around the trim wall and positioned in the trim housing cavity above the top wall of the channel during installation of the elastic band and at least part of the trim into the trim housing cavity, wherein the trim retention elastic band has an unstretched inner diameter (Dri) that is smaller than an outer diameter (Dt) of the trim, and wherein the trim retention elastic band is compressed by the trim wall and the trim housing wall such that the trim is attached to the trim housing by friction between the trim retention elastic band and the trim wall and between trim retention elastic band and the trim housing wall; and wherein the top wall of the channel limits an upward movement of the trim during installation of the trim into the trim housing cavity by preventing further movement of the trim flange into the trim housing once the trim flange comes in contact with the top wall.

2. The recessed light fixture of claim 1, further comprising a lens attached to the trim, wherein the trim has a trim cavity, and wherein the lens closes off a top opening of the trim.

3. The recessed light fixture of claim 1, further comprising a rotatable enclosure section, wherein a light source is attached to the rotatable enclosure section.

4. The recessed light fixture of claim 2, wherein the trim retention elastic band is positioned around the trim wall proximal to a bottom opening of the trim and wherein the bottom opening of the trim is wider than the top opening of the trim.

5. The recessed light fixture of claim 1, wherein the trim retention elastic band provides an airtight attachment between the trim and the trim housing.

6. The recessed light fixture of claim 1, wherein the trim housing comprises a trim housing flange that extends outwardly from the trim housing wall.

7. The recessed light fixture of claim 6, wherein the top wall of the channel limits the upward movement of the trim into the trim housing cavity such that the trim flange is flush with the trim housing flange.

8. The recessed light fixture of claim 1, wherein the trim retention elastic band is positioned on the trim flange.

9. The recessed light fixture of claim 1, wherein the trim is a reflector or a baffle.

10. The recessed light fixture of claim 1, wherein the trim retention elastic band is made from an elastomeric material.

11. The recessed light fixture of claim 1, wherein the recessed light fixture is a direct mount recessed light fixture.

12. The recessed light fixture of claim 11, further comprising light fixture retention brackets configured to retain the recessed light fixture recessed in a ceiling structure.

13. The recessed light fixture of claim 1, wherein the trim is attachable to the trim housing by toollessly forcing the trim and the trim retention elastic band into the trim housing cavity after the trim retention elastic band is attached to the trim around the trim wall.

14. The recessed light fixture of claim 1, wherein the trim is detachable from the trim housing.

15. A recessed light fixture, comprising:

a trim housing having a trim housing wall and a trim housing cavity bound by the trim housing wall, wherein the trim housing includes a channel formed at least in part by the trim housing, wherein the channel has a top wall;

a trim having a trim wall, wherein the trim includes a trim flange that extends outwardly from the trim wall, wherein the trim is at least partially positioned in the trim housing cavity;

a trim retention elastic band stretched around the trim wall and positioned in the trim housing cavity above the top wall of the channel during installation of the elastic band and at least part of the trim into the trim housing cavity, wherein the trim retention elastic band is compressed by the trim wall and the trim housing wall such that the trim is attached to the trim housing by friction between the trim retention elastic band and the trim wall and between trim retention elastic band and the trim housing wall;

wherein the top wall of the channel limits an upward movement of the trim during installation of the trim into the trim housing cavity by preventing further movement of the trim flange into the trim housing once the trim flange comes in contact with the top wall;

a lens attached to the trim, wherein the trim has a trim cavity, and wherein the lens closes off a top opening of the trim and prevents air flow through the trim cavity; and a rotatable enclosure section, wherein a light source is attached to the rotatable enclosure section and is configured to emit a light toward the lens and the trim cavity.

* * * * *